(12) United States Patent
Salter et al.

(10) Patent No.: US 9,464,776 B2
(45) Date of Patent: Oct. 11, 2016

(54) VEHICLE LIGHT SYSTEM WITH ILLUMINATING EXHAUST

(71) Applicant: Ford Global Technologies, LLC, Dearborn, MI (US)

(72) Inventors: Stuart C. Salter, White Lake, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 246 days.

(21) Appl. No.: 14/524,085

(22) Filed: Oct. 27, 2014

(65) Prior Publication Data

US 2015/0138810 A1    May 21, 2015

Related U.S. Application Data

(63) Continuation-in-part of application No. 14/086,442, filed on Nov. 21, 2013.

(51) Int. Cl.
| | |
|---|---|
| *B60Q 1/00* | (2006.01) |
| *B60Q 1/26* | (2006.01) |
| *F21S 8/10* | (2006.01) |
| *F01N 13/00* | (2010.01) |

(52) U.S. Cl.
CPC ........... *F21S 48/214* (2013.01); *B60Q 1/2688* (2013.01); *F01N 13/00* (2013.01); *F01N 2260/00* (2013.01); *F01N 2510/00* (2013.01)

(58) Field of Classification Search
CPC ...... B60Q 1/2688; F21N 13/00; F21S 48/20; F21S 48/214; F21S 48/22

USPC .......................................... 362/487, 510–511
See application file for complete search history.

(56) References Cited

U.S. PATENT DOCUMENTS

| | | | |
|---|---|---|---|
| 5,709,453 | A | 1/1998 | Krent et al. |
| 6,117,362 | A | 9/2000 | Yen et al. |
| 6,491,418 | B1 | 12/2002 | Chen |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |
| 6,820,888 | B1 | 11/2004 | Griffin |
| 6,851,840 | B2 | 2/2005 | Ramamurthy et al. |
| 6,859,148 | B2 | 2/2005 | Miller |
| 6,871,986 | B2 | 3/2005 | Yamanaka et al. |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Jason Moon Han
(74) *Attorney, Agent, or Firm* — Jason Rogers; Price Heneveld LLP

(57) ABSTRACT

An illumination apparatus for a vehicle is disclosed. The illumination apparatus comprises a photoluminescent portion disposed on a surface of a vehicle exhaust system component. The illumination apparatus further includes a light source located proximate the component. The light source is configured to emit light at a first wavelength directed toward the photoluminescent portion. The photoluminescent portion is configured to convert the first wavelength to at least a second wavelength to illuminate the exhaust system component and/or an area proximate the vehicle exhaust system.

20 Claims, 8 Drawing Sheets

(56) References Cited

U.S. PATENT DOCUMENTS

| | | | |
|---|---|---|---|
| 6,910,793 B1 | 6/2005 | Sheun | |
| 6,953,536 B2 | 10/2005 | Yen et al. | |
| 6,990,922 B2 | 1/2006 | Ichikawa et al. | |
| 7,161,472 B2 | 1/2007 | Strumolo et al. | |
| 7,213,923 B2 | 5/2007 | Liu et al. | |
| 7,264,366 B2 | 9/2007 | Hulse | |
| 7,264,367 B2 | 9/2007 | Hulse | |
| 7,441,914 B2 | 10/2008 | Palmer et al. | |
| 7,556,408 B2 | 7/2009 | Thomson | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | La Tendresse et al. | |
| 8,071,988 B2 | 12/2011 | Lee et al. | |
| 8,097,843 B2 | 1/2012 | Agrawal et al. | |
| 8,136,425 B2 | 3/2012 | Bostick | |
| 8,163,201 B2 | 4/2012 | Agrawal et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,286,378 B2 | 10/2012 | Martin et al. | |
| 8,408,766 B2 | 4/2013 | Wilson et al. | |
| 8,414,169 B2 | 4/2013 | Gloodt | |
| 8,415,642 B2 | 4/2013 | Kingsley et al. | |
| 8,421,811 B2 | 4/2013 | Odland et al. | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,773,012 B2 | 7/2014 | Ryu et al. | |
| 8,846,184 B2 | 9/2014 | Agrawal et al. | |
| 8,952,341 B2 | 2/2015 | Kingsley et al. | |
| 9,057,021 B2 | 6/2015 | Kingsley et al. | |
| 9,065,447 B2 | 6/2015 | Buttolo et al. | |
| 9,299,887 B2 | 3/2016 | Lowenthal et al. | |
| 2002/0159741 A1 | 10/2002 | Graves et al. | |
| 2002/0163792 A1 | 11/2002 | Formoso | |
| 2003/0179548 A1 | 9/2003 | Becker et al. | |
| 2004/0012977 A1 | 1/2004 | Hou | |
| 2004/0047159 A1 | 3/2004 | Lee | |
| 2004/0213088 A1 | 10/2004 | Fuwausa | |
| 2005/0056483 A1 | 3/2005 | Tsai | |
| 2006/0070789 A1 | 4/2006 | Dirkson | |
| 2006/0087826 A1 | 4/2006 | Anderson, Jr. | |
| 2007/0032319 A1 | 2/2007 | Tufte | |
| 2007/0285938 A1 | 12/2007 | Palmer et al. | |
| 2009/0219730 A1 | 9/2009 | Syfert et al. | |
| 2009/0251920 A1 | 10/2009 | Kino et al. | |
| 2009/0262515 A1 | 10/2009 | Lee et al. | |
| 2011/0012062 A1 | 1/2011 | Agrawal et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0335994 A1 | 12/2013 | Mulder et al. | |
| 2014/0065442 A1 | 3/2014 | Kingsley et al. | |
| 2014/0103258 A1 | 4/2014 | Agrawal et al. | |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0138789 A1 | 5/2015 | Singer et al. | |
| 2015/0267881 A1 | 9/2015 | Salter et al. | |
| 2016/0016506 A1 | 1/2016 | Collins et al. | |

FOREIGN PATENT DOCUMENTS

| | | |
|---|---|---|
| CN | 201193011 Y | 2/2009 |
| CN | 102350940 A | 2/2012 |
| CN | 203349141 U | 12/2013 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

VEHICLE LIGHT SYSTEM WITH ILLUMINATING EXHAUST

CROSS-REFERENCE TO RELATED APPLICATION

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE," the entire disclosure of which is hereby incorporated herein by reference.

FIELD OF THE INVENTION

The present invention generally relates to vehicle lighting systems, and more particularly, to vehicle lighting systems employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide accent lighting.

SUMMARY OF THE INVENTION

According to one aspect of the present invention, an illumination apparatus for a vehicle exhaust system is disclosed. The illumination apparatus comprises a photoluminescent portion disposed on a component of the vehicle exhaust system. The illumination apparatus further includes a light source located proximate the component. The light source is configured to emit light at a first wavelength directed toward the photoluminescent portion. The photoluminescent portion is configured to convert the first wavelength to a second wavelength.

According to another aspect of the present invention, an illumination system for a vehicle exhaust system is disclosed. The system comprises first and second photoluminescent portions disposed on an exhaust system component. The system further includes a light source located proximate the first and second photoluminescent portions. The light source is configured to emit light at a first wavelength. The photoluminescent portions are configured to convert the first wavelength to at least a second wavelength.

According to yet another aspect of the present disclosure, a method for illuminating a surface beneath a vehicle is disclosed. The method includes activating a light source in response to a pre-defined event. The light from the light source is directed at a first wavelength from the light source toward a photoluminescent portion disposed on a portion of the exhaust system. The photoluminescent portion converts light at the first wavelength to a second wavelength and illuminates an area proximate the exhaust system with the light at the second wavelength.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system for a vehicle configured to illuminate a portion of a surface beneath a vehicle. In some embodiments, a light source may be utilized to illuminate both the surface beneath the vehicle and a vehicle component, logo, emblem, text, decal, badge, or any other form of illuminated portion proximate a rear portion of the vehicle. The light source may be configured to emit light at a first wavelength or primary emission to excite a photoluminescent structure. The photoluminescent structure may be configured to convert the first wavelength of the light or the primary emission into a second wavelength or secondary emission. The first wavelength of the light may correspond to a first color of light and the second wavelength may correspond to a second color of light, different from the first color. While the various embodiments of the lighting system described herein refer to specific structures demonstrated in reference to at least one automotive vehicle, it will be appreciated that the vehicle lighting system may be utilized in a variety of applications.

Figure 1:
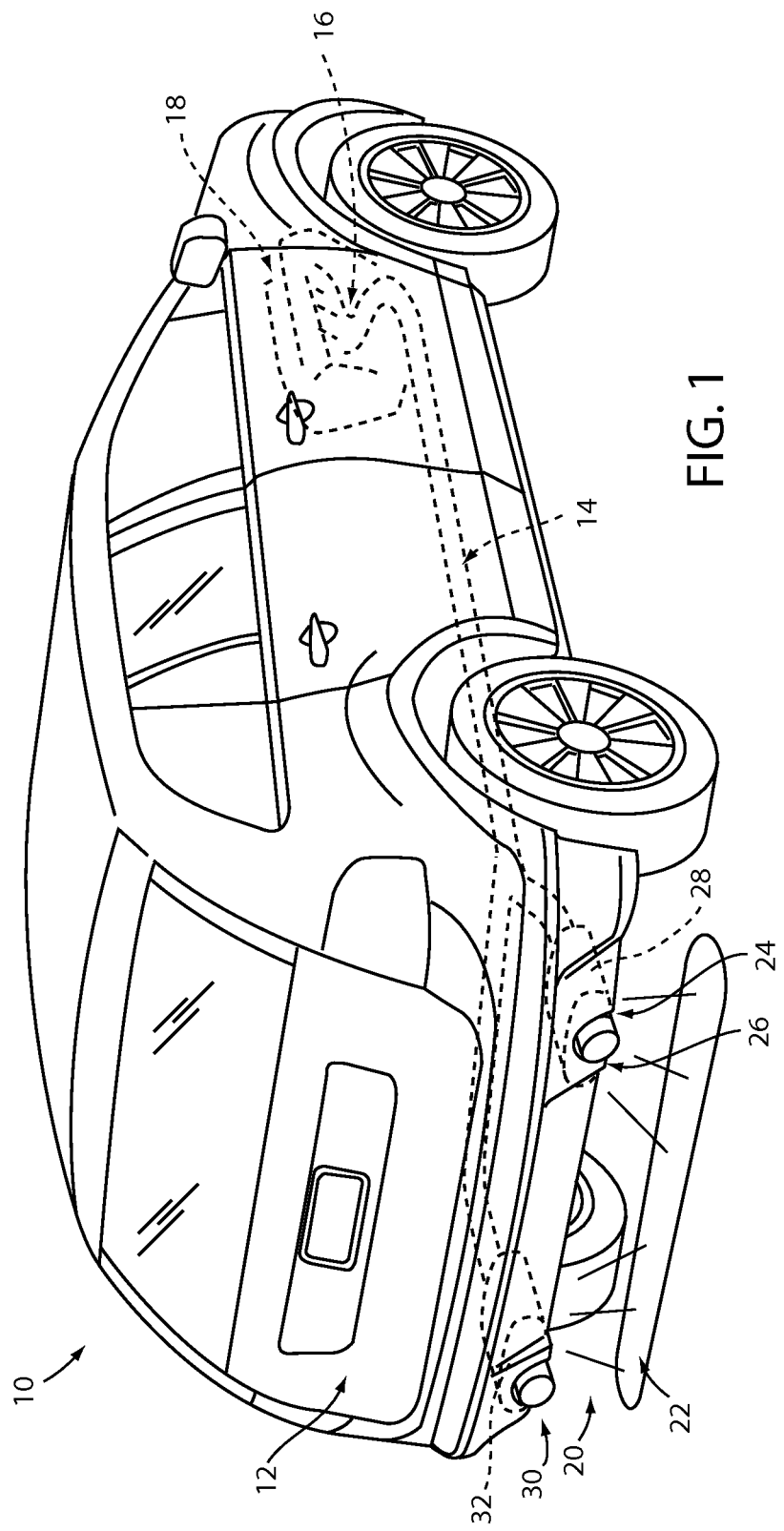
FIG. 1 is a rear perspective view of a vehicle comprising a lighting system for illuminating an exhaust system component.

Referring to FIG. 1, an automotive wheeled vehicle 10 is shown having a tailgate door 12 shown in a closed position. The vehicle 10 further includes an exhaust system 14 connected to the exhaust ports 16 of the vehicle engine 18 and extending to the rear end of the vehicle 10. The vehicle 10 is equipped with a lighting system 20 that may be configured to illuminate at least a portion of an approach surface 22, which is a portion of the ground located proximate the vehicle 10, or an exhaust system component 28 disposed within the vehicle. The lighting system 20 comprises a light source 24 that may be controlled by one or more lighting modules incorporated in the vehicle 10. For example, a lighting module of the vehicle 10 may be configured to selectively activate the light source 24 in response to the tailgate door 12 being oriented in the open position or as a key fob comes within a set distance of the vehicle 10, or any other desired pre-defined event.

The light source 24 is configured to emit diffused or non-focused light at a first wavelength. A first photoluminescent portion 26 having at least one photoluminescent structure 34 (FIG. 2) disposed thereon is located on a first vehicle exhaust system component 28. The first photoluminescent portion 26 is configured to convert the first wavelength of the light emitted from the light source 24 to a second wavelength. The second wavelength of the light may correspond to at least one wavelength having a different wavelength or spectral emission than the first wavelength.

The first wavelength may correspond to a primary emission having a deep blue color. The deep blue colored light may have a peak wavelength of approximately 440-500 nm. The second wavelength may correspond to one or more wavelengths of light corresponding to a secondary emission. In this configuration, the light emitted from the light source 24 at the first wavelength is configured to excite the first photoluminescent portion 26. In response to the excitation caused by the light at the first wavelength, the first photoluminescent portion 26 is configured to emit the secondary emission to illuminate the approach surface 22 beneath the vehicle 10 or at least an exhaust system component 28.

In some embodiments, the light source 24 is further configured to illuminate a second photoluminescent portion 30 that may be disposed on the same vehicle exhaust system component 28. Alternatively, the second photoluminescent portion 30 may be disposed on a second exhaust system component 32 or any other vehicle component proximate the rear of the vehicle 10. In various embodiments of the disclosed subject matter, the second photoluminescent portion 30 may be disposed on the same exhaust system component 28 as the first photoluminescent portion 26 and/or may comprise a logo, emblem, text, decal, badge, and/or any other form of illuminated portion proximate the rear portion of the vehicle 10. In this embodiment, the lighting system 20 may comprise a second light source having a second wavelength that is different from that of the first light source 24. Thus, the first photoluminescent portion 26 may emit a tertiary emission and the second photoluminescent portion 30 may emit a quaternary emission. The third and fourth wavelengths may correspond to different colors of light than the first wavelength and the second wavelength. As such, the lighting system 20 provides for various lighting and color arrangements.

The light emitted from the light source 24 at the first wavelength of light may correspond to a color of light that is less perceptible by the human eye compared to the wavelengths of the first and/or second photoluminescent portions 26, 30. In this advantageous configuration, the first emission of the light emitted from the light source 24 at the first wavelength may be projected toward the first and/or second photoluminescent portions 26, 30 without being visibly obvious to an operator and/or passenger entering the vehicle 10. This configuration may provide for the emissions from the first and/or second photoluminescent portions 26, 30 to be activated by the light source 24 being projected from a single location. In this way, the lighting system 20 is configured to provide lighting, ambient lighting, accent lighting, or any other form of lighting from a limited number of light sources 24. By limiting the number of light sources required to provide the lighting discussed herein, the disclosure provides for a cost-effective method for providing lighting for the vehicle 10.

Figure 2A:
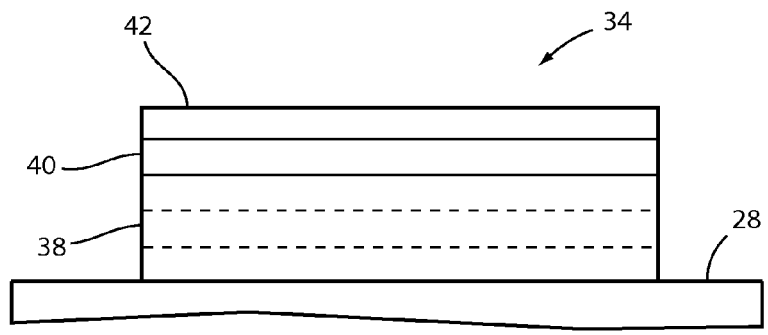
FIG. 2A is a side view of a photoluminescent structure rendered as a coating for use on the exhaust system according to one embodiment.
Figure 2B:
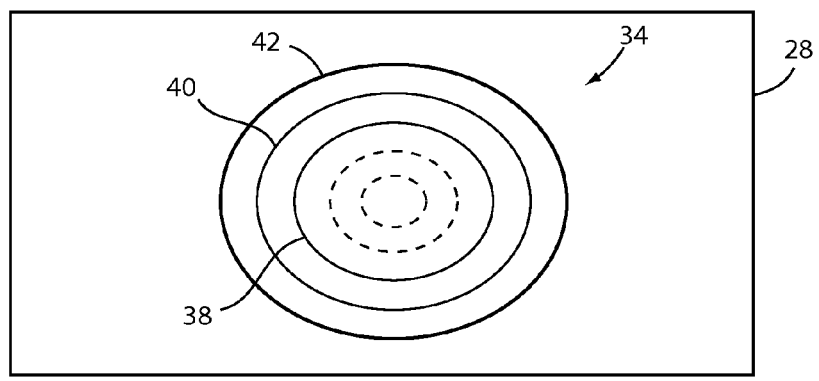
FIG. 2B is a top view of a photoluminescent structure rendered as a discrete particle according to one embodiment.
Figure 2C:
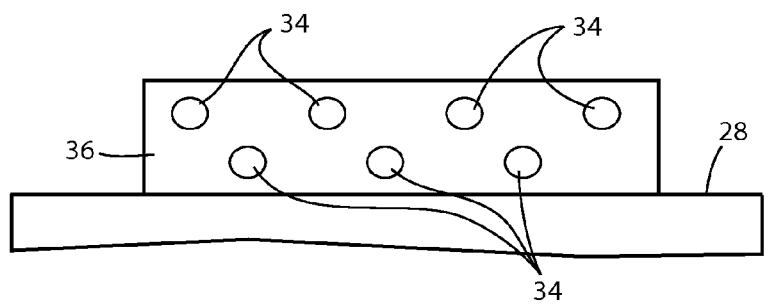
FIG. 2C is a side view a plurality photoluminescent structures rendered as discrete particles and incorporated into a separate structure.

Referring to FIGS. 2A-2C, various exemplary embodiments of a photoluminescent structures 34 are shown, each capable of being coupled to a first vehicle exhaust system component 28 or support member. In FIG. 2A, the photoluminescent structure 34 is generally shown rendered as a coating 36 (e.g., a film) that may be applied to a surface of the support member 28. In FIG. 2B, the photoluminescent structure 34 is generally shown as a discrete particle capable of being integrated with a support member 28. In FIG. 2C, the photoluminescent structure 34 is generally shown as a plurality of discrete particles that may be incorporated into a support medium 36 (e.g., a film) that may then be applied (as shown) or integrated with the support member 28.

At the most basic level, a given photoluminescent structure 34 includes an energy conversion layer 38 that may include one or more sub layers, which are exemplarily shown through broken lines in FIGS. 2A and 2B. Each sub layer of the energy conversion layer 38 may include one or more photoluminescent materials having energy converting elements with phosphorescent or fluorescent properties. Each photoluminescent material may become excited upon receiving light of a specific wavelength, thereby causing the light to undergo a conversion process. Under the principle of down conversion, the inputted light is converted into a longer wavelength light that is outputted from the photoluminescent structure 34. Conversely, under the principle of up conversion, the inputted light is converted into a shorter wavelength light that is outputted from the photoluminescent structure 34. When multiple distinct wavelengths of light are outputted from the photoluminescent structure 34 at the same time, the wavelengths of light may mix together and be expressed as a multicolor light.

In some embodiments, light that has been down converted or up converted may be used to excite other photoluminescent material(s) found in the energy conversion layer 38. The process of using converted light outputted from one photoluminescent material to excite another, and so on, is generally known as an energy cascade and may serve as an alternative for achieving various color expressions. With respect to either conversion principle, the difference in wavelength between the exciting light and the converted light is known as the Stokes shift and serves as the principle driving mechanism for an energy conversion process corresponding to a change in wavelength of light. In the various embodiments discussed herein, each of the photoluminescent structures 34 may operate under either conversion principle.

The energy conversion layer 38 may be prepared by dispersing the photoluminescent material in a polymer matrix to form a homogenous mixture using a variety of methods. Such methods may include preparing the energy conversion layer 38 from a formulation in a liquid carrier medium and coating the energy conversion layer 38 to a desired support member 28. The energy conversion layer 38 may be applied to a support member 28 by painting, screen printing, spraying, slot coating, dip coating, roller coating, and bar coating. Alternatively, the energy conversion layer 38 may be prepared by methods that do not use a liquid carrier medium. For example, the energy conversion layer 38 may be rendered by dispersing the photoluminescent material into a solid state solution (homogenous mixture in a dry state) that may be incorporated in a polymer matrix, which may be formed by extrusion, injection molding, compression molding, calendaring, thermoforming, etc. The energy conversion layer 38 may then be integrated into a support member 28 using any methods known to those skilled in the art. When the energy conversion layer 38 includes sub layers, each sub layer may be sequentially coated to form the energy conversion layer 38. Alternatively, the sub layers can be separately prepared and later laminated or embossed together to form the energy conversion layer 38. Alternatively still, the energy conversion layer 38 may be formed by coextruding the sub layers.

Referring back to FIGS. 2A and 2B, the photoluminescent structure 34 may optionally include at least one stability layer 40 to protect the photoluminescent material contained within the energy conversion layer 38 from photolytic and thermal degradation. The stability layer 40 may be configured as a separate layer optically coupled and adhered to the energy conversion layer 38. Alternatively, the stability layer 40 may be integrated with the energy conversion layer. The photoluminescent structure 34 may also optionally include a protection layer 42 optically coupled and adhered to the stability layer 40 or other layer (e.g., the conversion layer 38 in the absence of the stability layer 40) to protect the photoluminescent structure 34 from physical and chemical damage arising from environmental exposure. The stability layer 40 and/or the protective layer 42 may be combined with the energy conversion layer 38 through sequential coating or printing of each layer, sequential lamination or embossing, or any other suitable means.

Additional information regarding the construction of photoluminescent structures 34 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 A1 to Kingsley et al., entitled "PHOTOLUMINESCENT OBJECTS," filed Mar. 6, 2014; and U.S. Patent Publication No. 2014/0103258 A1 to Agrawal et al., entitled "CHROMIC LUMINESCENT COMPOSITIONS AND TEXTILES," filed Apr. 17, 2014, all of which are incorporated herein by reference in their entirety.

Figure 3:
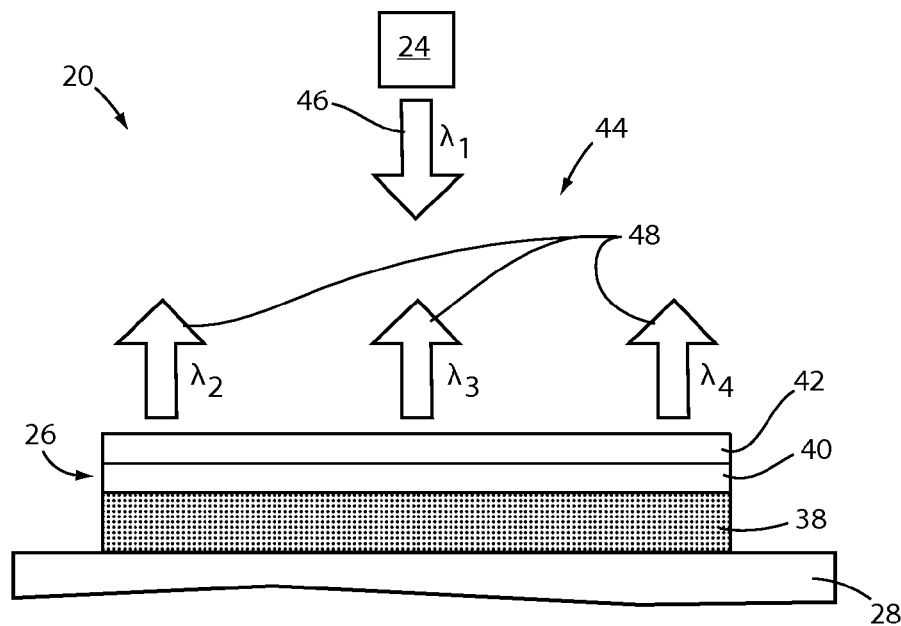
FIG. 3 illustrates the vehicle lighting system configured to convert a first emission of light to a second emission of light according to one embodiment.

Referring to FIG. 3, the lighting system 20 is generally shown in one embodiment according to a front-lit configuration 44 to convert the first emission 46 from the light source 24 to the second emission 48. The first emission 46 comprises a first wavelength $\lambda_1$, and the second emission 48 comprises a second wavelength $\lambda_2$. The lighting system 20 may include the photoluminescent portion 26 rendered as a coating 36 and applied to a substrate of a first vehicle exhaust system component 28. The photoluminescent portion 26 may include an energy conversion layer 38 and in some embodiments may include a stability layer 40 and/or protective layer 42. In response to the light source 24 being activated, the first emission 46 is converted from the first wavelength $\lambda_1$ to the second emission 48 having at least the second wavelength $\lambda_2$. The second emission 48 may comprise a plurality of wavelengths $\lambda_2$, $\lambda_3$, $\lambda_4$ configured to emit significantly white light from the first vehicle exhaust system component 28.

In various embodiments, the lighting system 20 comprises at least one energy conversion layer 38 configured to convert the first emission 46 at the first wavelength $\lambda_1$ to the second emission 48 having at least the second wavelength $\lambda_2$. In order to generate the plurality of wavelengths $\lambda_2$, $\lambda_3$, $\lambda_4$, the energy conversion layer 38 may comprise a red-emitting photoluminescent material, a green-emitting photoluminescent material, and a blue-emitting photoluminescent material dispersed in the polymer matrix. The red, green, and blue-emitting photoluminescent materials may be combined to generate the significantly white light for the second emission 48. Further, the red, green, and blue-emitting photoluminescent materials may be utilized in a variety of proportions and combinations to control the color of the second emission 48.

Each of the photoluminescent portions may vary in output intensity, output wavelength, and peak absorption wavelengths based on a particular photochemical structure and combinations of photochemical structures utilized in the energy conversion layer 38. As an example, the second emission 48 may be changed by adjusting the wavelength of the first emission 46 to activate the photoluminescent materials at different intensities to alter the color of the second emission 48. In addition to or alternatively to the red, green, and blue-emitting photoluminescent materials, other photoluminescent materials may be utilized alone and in various combinations to generate the second emission 48 in a wide variety of colors. In this way, the lighting system 20 may be configured for a variety of applications to provide a desired lighting color and effect for the vehicle 10.

The light source 24 may also be referred to as an excitation source and is operable to emit at least the first emission 46. The light source 24 may comprise any form of light source 24 for example halogen lighting, fluorescent lighting, light emitting diodes (LEDs), organic LEDs (OLEDs), polymer LEDs (PLEDs), solid state lighting or any other form of lighting configured to output the first emission 46. The first emission 46 from the light source 24 may be configured such that the first wavelength $\lambda_1$ corresponds to at least one absorption wavelength of the one or more photoluminescent materials of the energy conversion layer 38. In response to receiving the light at the first wavelength $\lambda_1$, the energy conversion layer 38 may be excited and output the one or more output wavelengths $\lambda_2$, $\lambda_3$, $\lambda_4$. The first emission 46 provides an excitation source for the energy conversion layer 38 by targeting absorption wavelengths of the various photoluminescent materials utilized therein. As such, the lighting system 20 is configured to output the second emission 48 to generate a desired light intensity and color.

Figure 4:
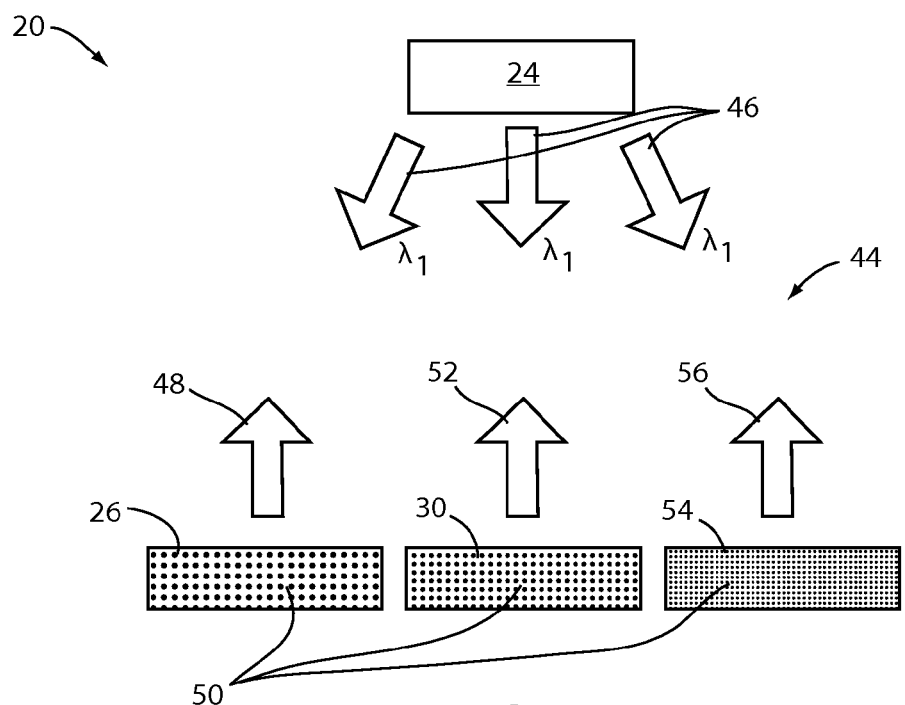
FIG. 4 is a schematic diagram illustrating the vehicle lighting system configured to convert a first emission of light to a plurality of emissions of light according to another embodiment.

Referring to FIG. 4, the lighting system 20 is shown in a front-lit configuration 44 according to another embodiment. In this exemplary embodiment, the light source 24 may be configured to emit the first emission 46 toward the plurality of photoluminescent portions 50. In this example, the plurality of photoluminescent portions 50 comprises a first photoluminescent portion 26, the second photoluminescent portion 30, and a third photoluminescent portion 54. Each of the photoluminescent portions 50 may be configured to convert the first wavelength $\lambda_1$ of the first emission 46 to one or more of the plurality of wavelengths $\lambda_2$, $\lambda_3$, $\lambda_4$. In this way, the first emission 46 may be converted into a plurality of emissions originating from each of the photoluminescent portions 50 to generate a multicolored lighting effect.

For example, the first photoluminescent portion 26 may comprise photoluminescent materials in an energy conversion layer 38 configured to generate the second emission 48. The second photoluminescent portion 30 may comprise photoluminescent materials in a energy conversion layer 38 configured to generate a third emission 52. The third photoluminescent portion 54 may comprise photoluminescent materials in an energy conversion layer 38 configured to generate a fourth emission 56. Similar to the energy conversion layer 38, discussed in reference to the embodiments shown in FIG. 3, photoluminescent materials configured to emit light of various colors may be utilized in a variety of proportions and combinations to control the output color of each of the second emission 48, the third emission 52, and the fourth emission 56. Based on a desired lighting effect, each of the emissions may comprise photoluminescent material configured to emit light having substantially similar colors, or a wide variety of color combinations.

Though the plurality to wavelengths is referred to as the wavelengths $\lambda_2$, $\lambda_3$, $\lambda_4$, the photoluminescent structures 34 may be combined in various proportions, types, layers, etc. to generate a variety of colors for the second emission 48. The photoluminescent structures 34 may also be utilized in a plurality of photoluminescent portions 50 distributed along a path of the first emission 46 to generate any number of emissions, for example a third emission 52, a fourth emission 56, etc. The third emission 52 may be emitted from the second photoluminescent portion 30 and the fourth emission 56 may be emitted from a third photoluminescent portion 54 disposed on the vehicle 10.

In an exemplary embodiment, the light source 24 comprises an LED configured to emit the first wavelength $\lambda_1$ which corresponds to a blue spectral color range. The blue spectral color range comprises a range of wavelengths generally expressed as blue light (~440-500 nm). In some embodiments, the first wavelength $\lambda_1$ may also comprise wavelengths in a near ultraviolet color range (~390-450 nm). In an exemplary embodiment, $\lambda_1$ may be approximately equal to 442 nm. In some embodiments, the first wavelength $\lambda_1$ may be approximately less than 500 nm such that the first wavelength of the light is not significantly visible. The light source 24 may include additional LEDs at varying wavelengths to excite different photoluminescent structures 34 disposed within a single photoluminescent portion or may each different wavelength may excite an individual photoluminescent portion.

The blue spectral color range and shorter wavelengths may be utilized as an excitation source for the lighting system 20 due to these wavelengths having limited perceptual acuity in the visible spectrum of the human eye. By utilizing shorter wavelengths for the first wavelength $\lambda_1$, and converting the first wavelength with the energy conversion layer 38 to at least one longer wavelength, the lighting system 20 creates a visual effect of light originating from the photoluminescent structure 34. In this configuration, light is emitted from the photoluminescent structure 34 (e.g., the first photoluminescent portion 26, the second photoluminescent portion 30) from locations of the vehicle 10 that may be inaccessible or costly to add conventional light sources requiring electrical connections.

As discussed herein, each of the plurality of wavelengths $\lambda_2$, $\lambda_3$, $\lambda_4$ may correspond to a significantly different spectral color range. The second wavelength $\lambda_2$ may correspond to the excitation of a red-emitting photoluminescent material having a wavelength of approximately 622-750 nm. The third wavelength $\lambda_3$ may correspond to the excitation of a green emitting photoluminescent material having a wavelength of approximately 526-606 nm. The fourth wavelength $\lambda_4$ may correspond to a blue or blue green emitting photoluminescent material having a wavelength longer than the first wavelength $\lambda_1$ and approximately 430-525 nm. Though the wavelengths $\lambda_2$, $\lambda_3$, $\lambda_4$ are discussed herein as being utilized to generate a significantly white light, various combinations of photoluminescent materials may be utilized in the energy conversion layer 38 to convert the first wavelength $\lambda_1$ to one or more wavelengths corresponding to a variety of colors.

To achieve the various colors and combinations of photoluminescent materials described herein, the lighting system 20 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,227,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 A1 to Kingsley et al., entitled "PHOTOLUMINESCENT OBJECTS," filed Mar. 6, 2014; and U.S. Patent Publication No. 2014/0103258 A1 to Agrawal et al., entitled "CHROMIC LUMINESCENT COMPOSITIONS AND TEXTILES," filed Apr. 17, 2014, all of which are included herein by reference in their entirety.

Figure 5:
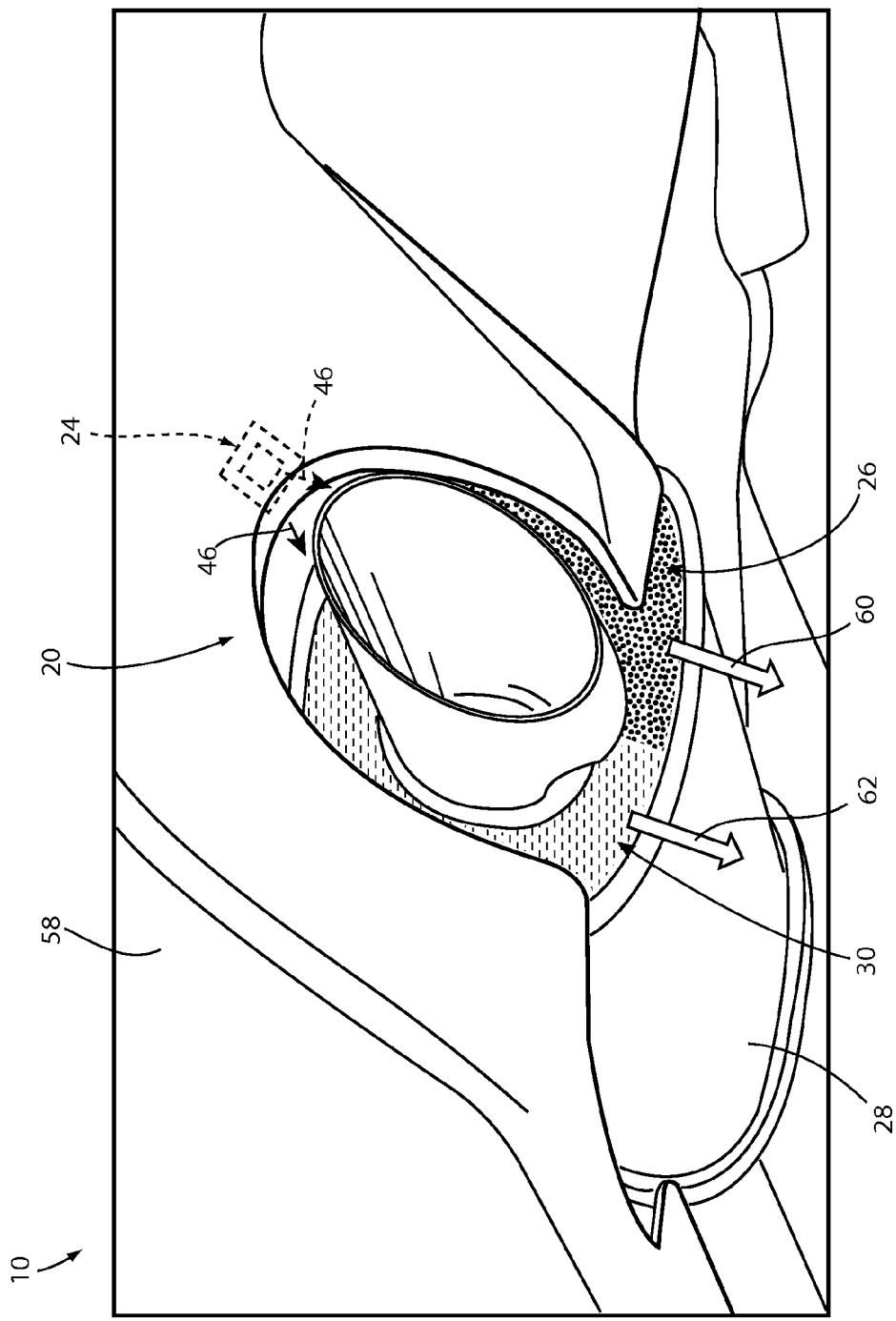
FIG. 5 is a perspective view of a portion of an exhaust system having a lighting system configured to illuminate an exhaust system component.

Referring to FIG. 5, the lighting system 20 is shown having a first photoluminescent portion 26 disposed on a surface of a first vehicle exhaust system component 28, such as a vehicle muffler. A second photoluminescent portion 30 is disposed on the same surface proximate the first photoluminescent portion 26. In this exemplary configuration, the light source 24 is configured to emit the first emission 46 towards the surface having the first and second photoluminescent portions 26, 30 disposed thereon such that when a passenger approaches the rear portion of the vehicle 10 the first emission 46 is directed toward the first and second photoluminescent portions 26, 30. The first and second photoluminescent portions 26, 30 are excited by the first emission and thereby illuminate an approach surface 22 proximate the vehicle 10. In some embodiments, the light source 24 may be mounted to or disposed on the B-side of a vehicle bumper 58.

The light source 24 is controlled by one or more lighting modules incorporated within the vehicle 10 and may be selectively activated in response to the tailgate door 12 being oriented in the open position. Alternatively, the lighting modules may activate the light source 24 in response to any pre-defined vehicle operation, such as when a vehicle 10 begins the braking process, or when a turn signal is activated. For example, when a vehicle door such as the tailgate 12 (FIG. 1) is placed in the open position which may be detected by a sensor, the first emission is directed along the arrows 46 to illuminate the first photoluminescent portion 26 and the second photoluminescent portion 30 in light at the first wavelength $\lambda_1$. In response to receiving the light at the first wavelength $\lambda_1$, the energy conversion layer 38 of each of the first photoluminescent portion 26 and/or the second photoluminescent portion 30 is excited such that the first wavelength is converted to a second and/or third wavelength directed along the arrows 60, 62.

In an alternate example, the light source 24 may emit light at a first wavelength $\lambda_1$ in a first pre-defined state from the light source 24. In response, the photoluminescent portions 26, 30 may emit a combined light of a first color. When a second predefined state is reached, the light source 24 may emit light at a second wavelength $\lambda_2$ singularly or in combination with light emitted at the first wavelength $\lambda_1$, or the light source 24 may emit a higher intensity of light at the first $\lambda_1$ and/or second $\lambda_2$ wavelength. In response, the photoluminescent portions 26, 30 may emit a second color of light or emit the first color of light at an intensity different from that of the first pre-defined state.

Figure 6:
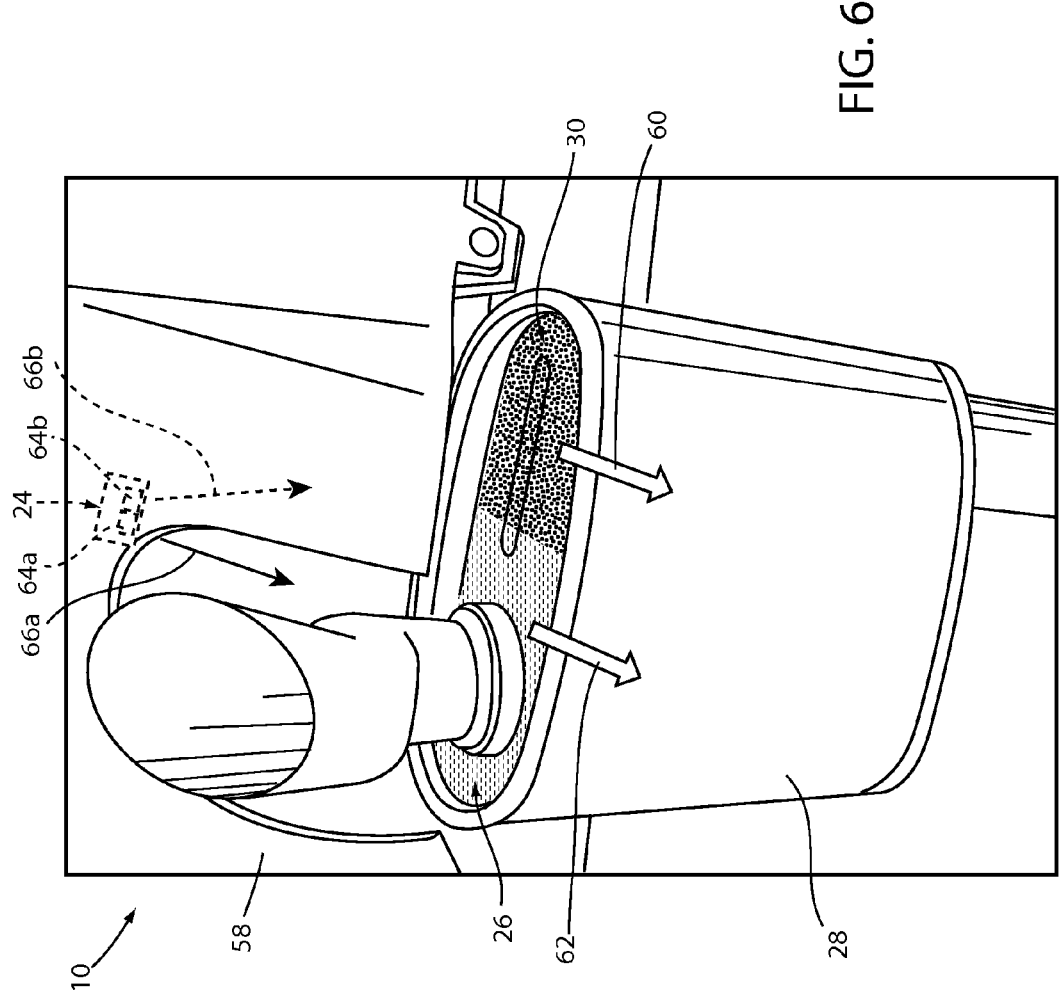
FIG. 6 is a perspective view of a vehicle having a lighting system configured to illuminate at least one exhaust system component.

Referring to FIG. 6, the first photoluminescent portion 26 is shown disposed on a surface of a first vehicle exhaust system component 28, such as a vehicle muffler. The light source 24 includes a first LED 64a that produces a first emission of light 66a at a first wavelength. In response to the excitation of the energy conversion layer 38 of the first photoluminescent portion 26 to the first emission 66a, the first photoluminescent portion 26 is configured to emit a second emission 62 at a second wavelength toward the approach surface 22 beneath a rear portion of the vehicle 10. The second photoluminescent portion 30 is disposed proximate the first photoluminescent portion 26. Thus the second photoluminescent portion 30 is also disposed on the vehicle muffler 28 in the illustrated embodiment. The light source 24 further includes a second LED 64b configured to emit a third emission of light 66b proximate the vehicle muffler to excite the second photoluminescent portion 30. In response to the excitation of the energy conversion layer 38 of the second photoluminescent portion 30 to the second light source 64b, the second photoluminescent portion 30 is configured to emit a fourth emission of light 60 toward the approach surface 22 beneath a rear portion of the vehicle 10. Through the use of first and second LEDs 64a, 64b and a plurality of photoluminescent portions 26, 30, a wide variety of illumination colors and effects may be possible to illuminate the approach surface 22 proximate to or around the vehicle 10 or a component 28 of the exhaust system 14. The illumination provided is through a non-direct, unfocused light source 24.

The second emission 62 from the first photoluminescent portion 26 may be configured to emit substantially white light having a plurality of wavelengths as discussed in reference to FIG. 3. Further, in some embodiments, the second emission 62 may emit light at a variety of wavelengths corresponding to any color of light. In an exemplary embodiment, the substantially white light emitted from the first photoluminescent portion 26 may provide illumination of the approach surface 22 beneath the vehicle 10. In this configuration, the first photoluminescent portion 26 may be configured to provide a puddle light or ground light to illuminate the approach surface 22 of the ground proximate the tailgate door 12. As a puddle lamp, the photoluminescent portion 26 may be configured to illuminate a region on the ground proximate the tailgate door 12 to provide access lighting to the vehicle 10. The second photoluminescent portion 30 may be disposed adjacent to the first photoluminescent portion 26. The fourth emission 60 from the second photoluminescent portion 30 may be configured to emit substantially white light or colored light as discussed in reference to FIGS. 3 and 4. Further, the second photoluminescent portion 30 may be excited by a second light source 24 having a different wavelength from that of the first light source 24. Excitation of the first and second photoluminescent portions 26, 30 may create a combined illumination of white light proximate a rear portion of the vehicle 10.

Moreover, the photoluminescent portions 26, 30 may be disposed proximate each other, combined together within a single area, alternated portions proximate each other, or disposed in any other practical pattern to create the desired lighting effects of the lighting system 20 described herein.

In some embodiments, a third photoluminescent portion 54 may be disposed on a rear portion of the vehicle 10 that is excitable by light source 24 within the lighting system 20. In response to receiving the emission of light from the light source 24, the third photoluminescent portion 54 may be configured to emit an emission that is substantially white light or light of any color. In some embodiments, the third photoluminescent portion emission, or fourth emission, 56 may be configured to emit a different color of light than the other present emissions. The third photoluminescent portion emission 56 may be disposed proximate the second photoluminescent portion 30 and provide further accent lighting to complement a graphic. Based on a desired lighting effect, each of the emissions may comprise photoluminescent materials configured to emit light having substantially similar colors, or a wide variety of color combinations. The third photoluminescent portion 54 may be on an additional component 32 within the exhaust system 14 or another vehicle component proximate the exhaust system 14. The third photoluminescent portion 54 may also illuminate the component. The photoluminescent portion is disposed on or may be disposed around a logo on the component which then casts the shadow of the logo onto the approach surface 22 when the third photoluminescent portion is excited by the light source 24 of the lighting system 20.

Figure 7:
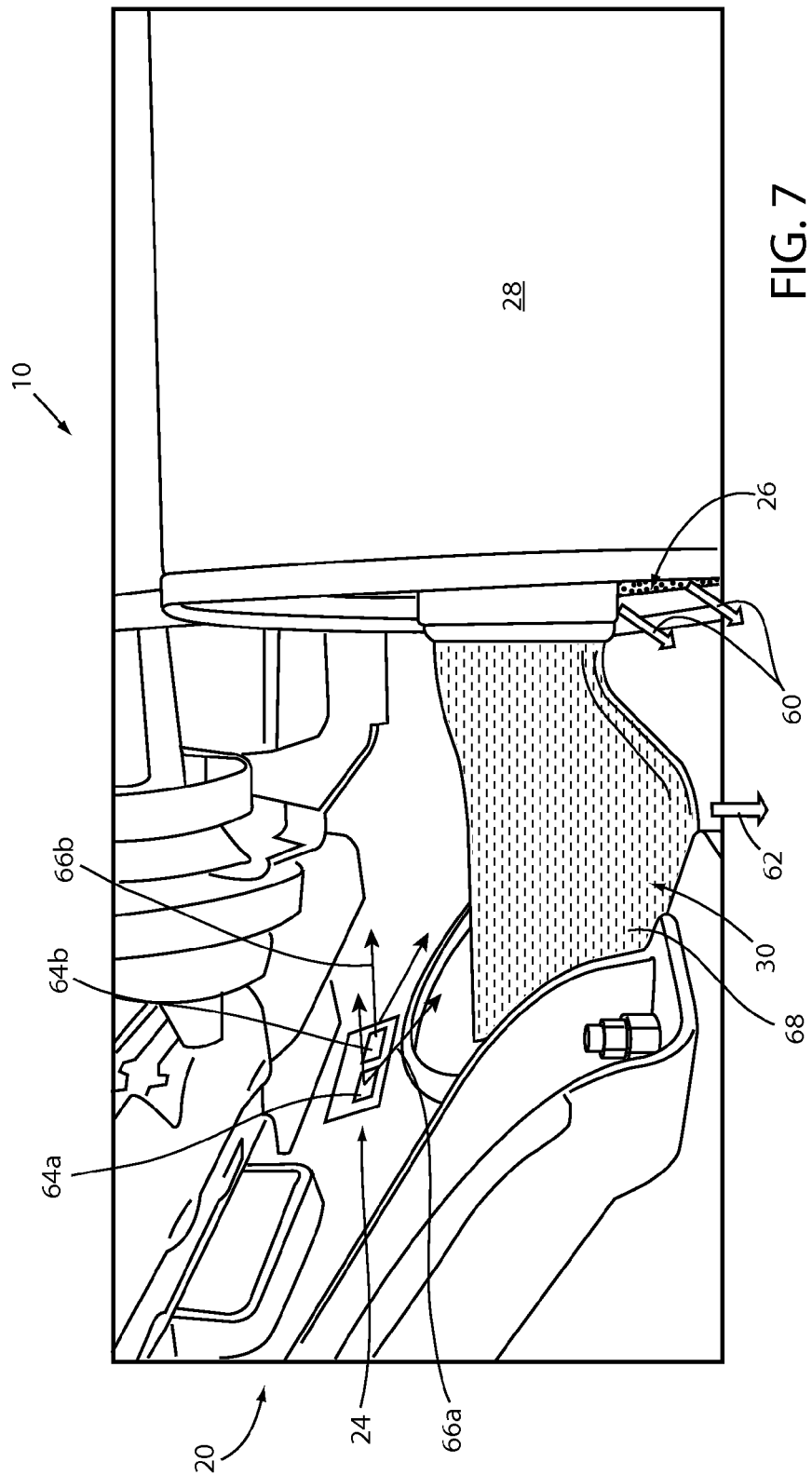
FIG. 7 is a perspective view of a vehicle having a lighting system configured to illuminate at least a portion of an exhaust system component.

Referring to FIG. 7, a rear portion of a vehicle 10 having the lighting system 20 with illuminating exhaust is shown according to another embodiment. A light source 24 is disposed on a portion of the vehicle rear bumper 58 of the vehicle 10 in this embodiment. It is contemplated that the light source 24 may be disposed at any practical location on a rear portion of a vehicle 10. In the illustrated embodiment, the light source 24 is a pair of LEDs 64a, 64b that directs a first emission 66a of light towards a first photoluminescent portion 26 disposed on a first exhaust system component 28, such as the vehicle muffler. In response to the first emission 66a of light at a first wavelength $\lambda_1$, the first photoluminescent portion 26 illuminates as a second emission of light 60 at a second wavelength $\lambda_2$ different than that of the first wavelength. As discussed herein, the light source 24 may emit a first emission 66a of light based on pre-defined events, such as a passenger approaching the vehicle 10.

In the illustrated embodiment of FIG. 7, the second photoluminescent portion 30 is disposed on a second exhaust system component, such as the vehicle tailpipe 68. In response to emission of light 66b from the second LED 64b, the second photoluminescent portion 30 emits light 62 at the second $\lambda_2$ or a fourth wavelength $\lambda_4$. Additionally, through a variance of colors between the first and second photoluminescent portions 26, 30, aesthetic effects can be created, such as an illuminated projection of flames or any other desired aesthetic effect, near the end of the exhaust system 14 of the vehicle 10.

Figure 8:
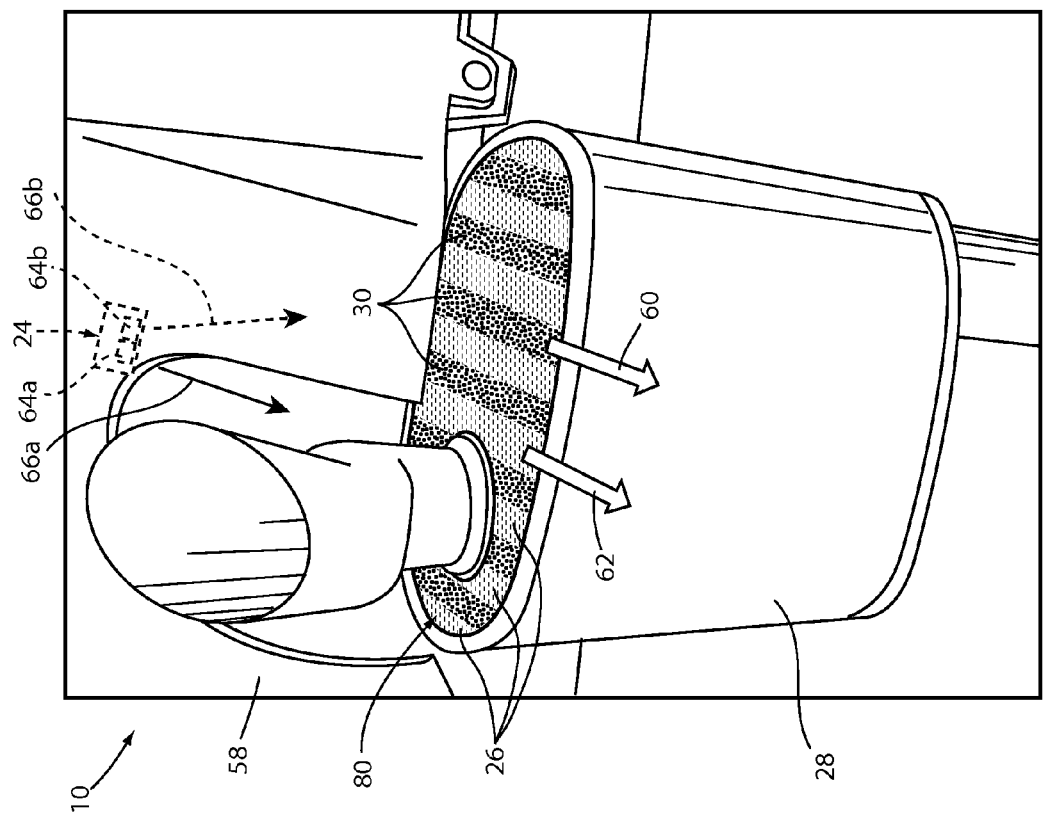
FIG. 8 is a perspective view of a vehicle having a lighting system configured to illuminate at least a portion of an exhaust system component including two photoluminescent structures.

Referring to FIG. 8, an alternate embodiment of the lighting system 20 is shown. In the illustrated embodiment, an attachment member 80 is shown attached to the vehicle muffler 28. The attachment member 80 may be coupled to the vehicle muffler, or any other vehicle exhaust system component 28, through any known means. First and second photoluminescent portions 26, 30 are disposed on a rearward facing surface of the attachment member 80. The attachment member 80 separates the photoluminescent portions 26, 30 from the vehicle muffler, thereby partially insulating the photoluminescent portions 26, 30 from the heat of a vehicle exhaust system component 28. The attachment member 80 may be made of a material, preferably having a low thermal conductivity, to provide additional insulation from the heat of the vehicle exhaust system component 28. Further, additional materials may be disposed to between the attachment member 80 and the heated surface of the vehicle exhaust system component 28 to provide supplemental insulation. The attachment member 80 may also be angled in any direction such that the light emitted from the photoluminescent portions 26, 30 is directed to a preferred location, such as the approach surface 22 proximate the rear of the vehicle 10.

Still referring to FIG. 8, the first and second photoluminescent portions 26, 30 are on a surface of the attachment member 80 in an interlaced or striped pattern. Each photoluminescent portion 26, 30 stripe may be in any direction and of any practicable width to create the desired lighting effects. Through the use of a stripped pattern, it is possible for the combined light emitted from the first and second photoluminescent portions 26, 30 to appear as a homogenous color. In another embodiment, the light source 24 may excite only the first photoluminescent portion 26 followed by only the second photoluminescent portion 30 in any desired pattern to create a desired lighting effect proximate the rear end of the vehicle 10.

Additional photoluminescent portions may be interlaced within the surface of the attachment member 80 having the first and second photoluminescent portions 26, 30 disposed thereon, or may be disposed on a second surface. The additional photoluminescent portions may be excited individually by the light source 24 or in combination with the first and second photoluminescent portions 26, 30 to create a wide range of colors and effects. For example, the light source 24 may rapidly excite alternating photoluminescent portions 26, 30 to create a flickering effect. Additionally, the light source 24 may vary the intensity of light emitted therefrom based on a pre-defined event such as when a pre-set engine RPM is exceeded or when a specific speed has been reached. The intensity may also be varied based on any other data obtained within the vehicle, such as whether the vehicle 10 is being operated during the day or at night.

Figure 9:
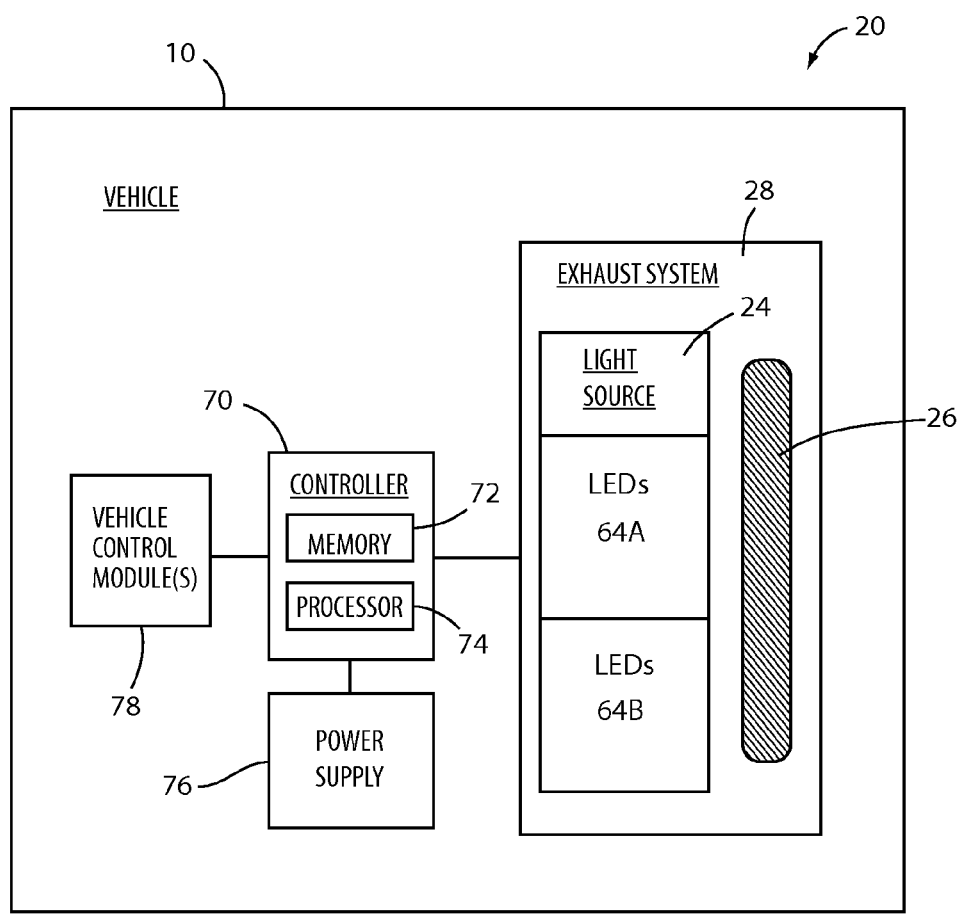
FIG. 9 is a block diagram of the vehicle lighting system.

Referring to FIG. 9, a box diagram of a vehicle 10 is shown in which a lighting system 20 is implemented using at least one exhaust system component 28. The lighting system 20 includes a controller 70 in communication with the light source 24. The controller 70 may include a memory 72 having instructions contained therein that are executed by a processor 74 of the controller 70. The controller 70 may provide electrical power to the light source 24 via a power supply 76 located onboard the vehicle 10. In addition, the controller 70 may be configured to control the light output of each light source 24 based on feedback received from one or more vehicle control modules 78 such as, but not limited to, a body control module, engine control module, steering control module, brake control module, the like, or a combination thereof. By controlling the light output of the light source 24 the photoluminescent portion may illuminate in a variety of colors and/or patterns to provide ambient light or useful vehicle information to an intended observer. For example, the illumination provided by the photoluminescent portion 26 may be used for numerous vehicle applications, such as, but not limited to, a car finding feature, a remote start indicator, a door lock indicator, a door ajar indicator, a warning indicator, a turn indicator, a break indicator, etc.

In operation, the photoluminescent portion 26 may exhibit a constant unicolor or multicolor illumination. For example, the controller 70 may prompt the light source 24 to emit only the first wavelength of light via LEDs 64a, 64b to cause the photoluminescent portion 26 to illuminate in the first color (e.g., white). Alternatively, the controller 70 may prompt the light source 24 to emit only the second wavelength of light via LEDs 64a, 64b to cause the photoluminescent portion 26 to illuminate in the second color (e.g., red). Alternatively still, the controller 70 may prompt the light source 24 to simultaneously emit the first and second wavelengths of light to cause the photoluminescent portion 26 to illuminate in a third color (e.g. pinkish) defined by an additive light mixture of the first and second colors. Moreover, additional photoluminescent portions 32 may be added to the lighting system 20 that converts the first and/or second emissions from the light source 24 to a third and/or fourth emission. The third and fourth emissions may be of any wavelength and may combine to form a substantially white light proximate the rear portion of a vehicle 10.

In another embodiment, the photoluminescent portion 26 may exhibit periodic unicolor or multicolor illumination. For example, the controller 70 may prompt the light source 24 to periodically emit only the first wavelength of light via LEDs 64a, 64b to cause the photoluminescent portion 26 to periodically illuminate in the first color. Alternatively, the controller 70 may prompt the light source 24 to periodically emit only the second wavelength of light via LEDs 64a, 64b to cause the photoluminescent portion 26 to periodically illuminate in the second color. Alternatively, the controller 70 may prompt the light source 24 to simultaneously and periodically emit the first and second wavelengths of light to cause the photoluminescent portion 26 to periodically illuminate in a third color defined by an additive light mixture of the first and second colors. Alternatively still, the controller 70 may prompt the light source 24 to alternate between periodically emitting the first and second wavelengths of light to cause the photoluminescent portion 26 to periodically illuminate by alternating between the first and second colors. The controller 70 may prompt the light source 24 to periodically emit the first and/or second wavelengths of light at a regular time interval and/or an irregular time interval.

With respect to the above examples, the controller 70 may modify the intensity of the emitted first and second wavelengths of light by pulse-width modulation or current control. In some embodiments, the controller 70 may be configured to adjust a color of the emitted light by sending control signals to adjust an intensity or energy output level of the light source 24. For example, if the light source 24 is configured to output the first emission at a low level, substantially all of the first emission may be converted to the second emission. In this configuration, a color of light corresponding to the second emission may correspond to the color of the emitted light from the first vehicle exhaust system component 28. If the light source 24 is configured to output the first emission at a high level, only a portion of the first emission may be converted to the second emission. In this configuration, a color of light corresponding to mixture of the first emission and the second emission may be output as the emitted light emitted light. In this way, each of the controllers 70 may control an output color of the emitted light.

Though a low level and a high level of intensity are discussed in reference to the first emission it shall be understood that the intensity of the first emission may be varied among a variety of intensity levels to adjust a hue of the color corresponding to the emitted light from the first vehicle exhaust system component 28. As described herein, the color of the second emission may be significantly dependent on the particular photoluminescent materials utilized in the photoluminescent portion 26. Additionally, a conversion capacity of the photoluminescent portion 26 may be significantly dependent on a concentration of the photoluminescent materials utilized in the photoluminescent portion 26. By adjusting the range of intensities that may be output from the light source 24 the concentration and proportions of the photoluminescent structures 34 in the photoluminescent portion 26 and the types of photoluminescent materials utilized in the photoluminescent portion 26 the lighting devices discussed herein may be operable to generate a range of color hues of the emitted light by blending the first emission with the second emission.

Accordingly a lighting system 20 employing an illuminating exhaust assembly has been advantageously described herein. The lighting system 20 may provide various benefits including a simple and cost-effective means to produce a variety of illumination that may be used as a styling feature and/or to inform an intended user of a particular vehicle status.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An illumination apparatus for a vehicle exhaust system comprising:
   a photoluminescent portion disposed on a component of the vehicle exhaust system; and
   a light source separately located proximate the component configured to emit light at a first wavelength directed toward the photoluminescent portion, wherein the photoluminescent portion is configured to convert the first wavelength to a second wavelength.

2. The illumination apparatus according to claim 1, wherein the photoluminescent portion is disposed on a vehicle muffler.

3. The illumination apparatus according to claim 1, wherein the photoluminescent portion illuminates an approach surface proximate a rear end of the vehicle.

4. The illumination apparatus according to claim 1, wherein the light source is disposed on a bumper of the vehicle.

5. The illumination apparatus according to claim 1, further comprising:
   a second photoluminescent portion disposed proximate the first photoluminescent portion.

6. The illumination apparatus according to claim 5, wherein the light source is further configured to direct the light at the first wavelength toward the second photoluminescent portion.

7. The illumination apparatus according to claim 5, wherein the second photoluminescent portion is configured to convert the first wavelength to a third wavelength having a different color than the second wavelength.

8. The illumination apparatus according to claim 5, wherein the second photoluminescent portion is disposed on a second exhaust system component.

9. An illumination system for a vehicle exhaust system comprising:
   first and second photoluminescent portions disposed on an exhaust system component; and a light source separately located proximate the first and second photoluminescent portions configured to emit light at a first wavelength, wherein the photoluminescent portions are configured to convert the first wavelength to at least a second wavelength.

10. The illumination system according to claim 9, wherein the first and second photoluminescent portions are configured to illuminate in varying colors based on a pre-defined event.

11. The illumination system according to claim 9, wherein the light source is configured to direct the light at the first wavelength toward the first photoluminescent portion and the second photoluminescent portion when a vehicle door is oriented in an open position.

12. The illumination system according to claim 9, wherein the exhaust system component is a vehicle muffler.

13. The illumination system according to claim 9, wherein the exhaust system comprises first and second components each having the first and second photoluminescent portions disposed thereon.

14. The illumination system according to claim 9, wherein the second photoluminescent portion is configured to convert the first wavelength to a third wavelength having a different color than the second wavelength.

15. A method for illuminating a surface beneath a vehicle comprising:
   activating a light source;
   directing light at a first wavelength from the light source toward a photoluminescent portion separately disposed on a portion of the exhaust system;
   converting light at the first wavelength to a second wavelength with the photoluminescent portion; and
   illuminating an area proximate the exhaust system with the light at the second wavelength.

16. The method according to claim 15, wherein the light source is activated in response to a pre-defined event.

17. The method according to claim 15, further comprising:
   emitting the light at the second wavelength from the photoluminescent portion toward an approach surface.

18. The method according to claim 16, wherein the pre-defined event is the opening of a vehicle door.

19. The method according to claim 15, further comprising:
   directing the light at the first wavelength toward a second photoluminescent portion.

20. The method according to claim 19, further comprising:
   converting the light at the first wavelength to a third wavelength with the second photoluminescent portion, the third wavelength corresponding to a different color than the second wavelength.

* * * * *